United States Patent
Asrani

(10) Patent No.: US 9,766,666 B1
(45) Date of Patent: Sep. 19, 2017

(54) METALLIC HOUSING FOR SHORT-RANGE WIRELESS COMMUNICATION

(71) Applicant: Google Inc., Mountain View, CA (US)

(72) Inventor: Vijay L. Asrani, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/208,925

(22) Filed: Jul. 13, 2016

(51) Int. Cl.
*H04B 5/00* (2006.01)
*G06F 1/16* (2006.01)
*H05K 9/00* (2006.01)
*G06F 1/18* (2006.01)

(52) U.S. Cl.
CPC .......... *G06F 1/1698* (2013.01); *G06F 1/1643* (2013.01); *G06F 1/181* (2013.01); *H04B 5/0031* (2013.01); *H04B 5/0037* (2013.01); *H04B 5/0081* (2013.01); *H05K 9/002* (2013.01)

(58) Field of Classification Search
USPC .............. 455/550.1, 41.1–41.3, 575.1–575.7
See application file for complete search history.

(56) References Cited

U.S. PATENT DOCUMENTS

| 7,456,793 | B2 | 11/2008 | Napoles et al. | |
|---|---|---|---|---|
| 9,059,505 | B1 | 6/2015 | Asrani et al. | |
| 2013/0234910 | A1* | 9/2013 | Oh | H01Q 1/243 343/872 |
| 2014/0228080 | A1* | 8/2014 | Choi | B29C 45/14639 455/575.1 |
| 2015/0189767 | A1* | 7/2015 | Asrani | B32B 15/08 312/223.1 |
| 2016/0380337 | A1* | 12/2016 | Lee | H01Q 1/243 343/702 |
| 2017/0048649 | A1* | 2/2017 | Olgun | H04W 4/008 |

* cited by examiner

*Primary Examiner* — Fayyaz Alam
(74) *Attorney, Agent, or Firm* — Shumaker & Sieffert, P.A.

(57) ABSTRACT

A computing device is described as including a display, an antenna element, at least one processor, and a housing. The display forms a first exposed surface of the computing device. The antenna element is configured to receive a wireless signal. The at least one processor is configured to receive, from the antenna element, an indication of the wireless signal and to output information to the display. The housing forms a second exposed surface of the computing device. The housing is formed by a group of metallic components. The group of metallic components are electronically isolated from the at least one processor.

15 Claims, 10 Drawing Sheets

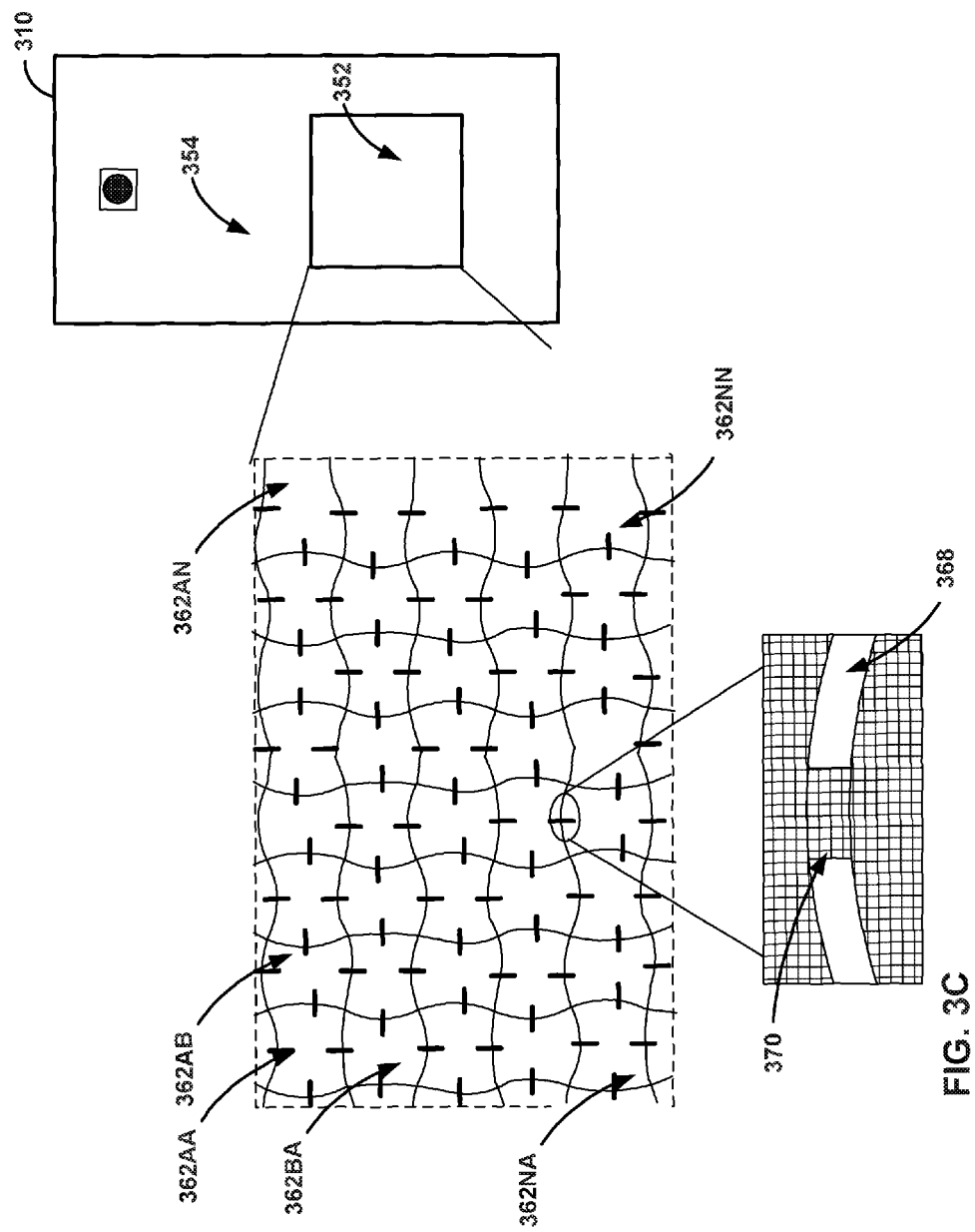

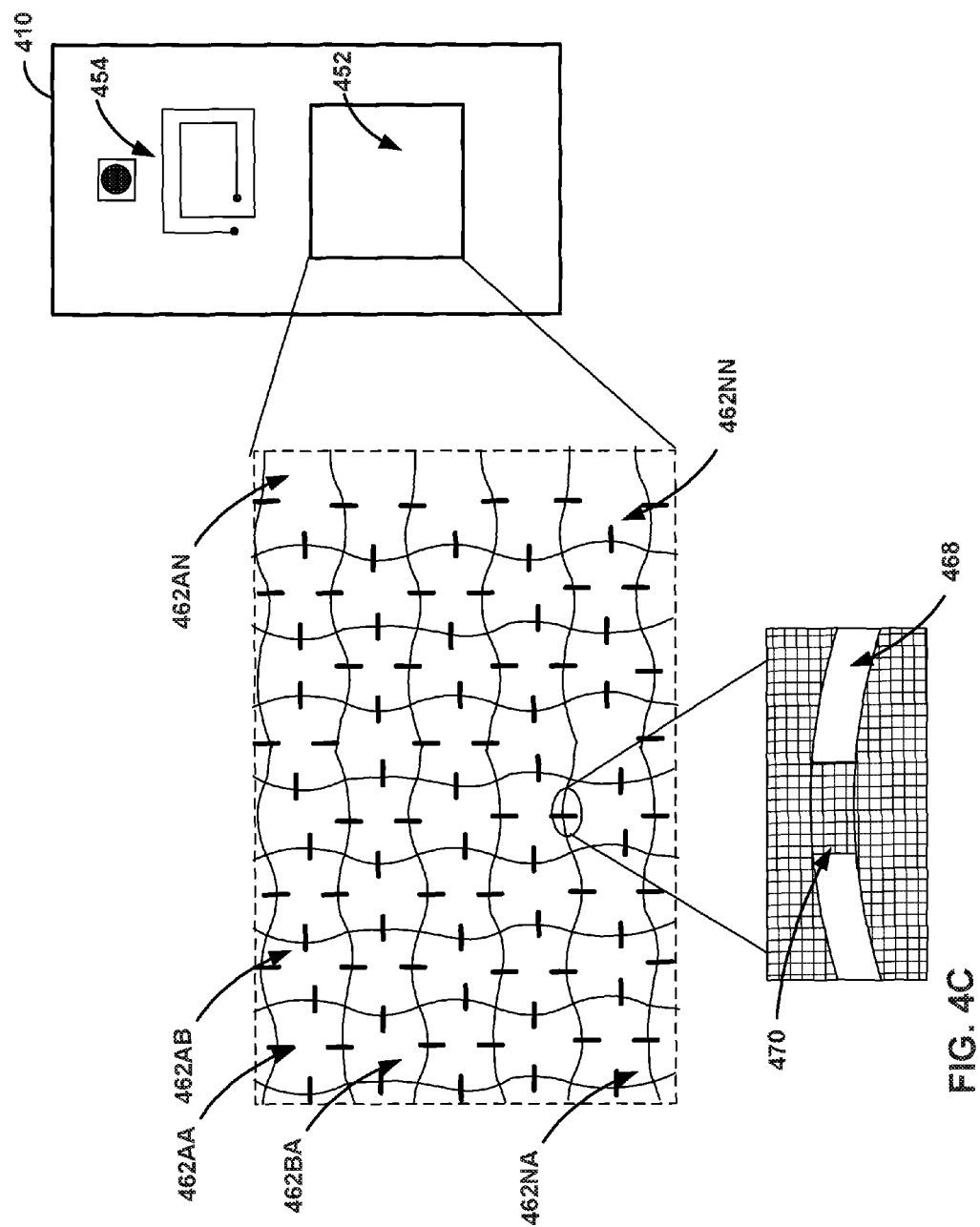

METALLIC HOUSING FOR SHORT-RANGE WIRELESS COMMUNICATION

TECHNICAL FIELD

This disclosure relates to an enclosure for a computing device.

BACKGROUND

Computing devices can include a metallic housing for strength, durability, and aesthetic appearance. For example, a metallic housing may be formed of an aluminum alloy. Additionally, computing devices can utilize various communication protocols and topologies. For example, a computing device having an aluminum alloy housing may be configured to communicate using near-field communication (NFC), wireless local area network, code division multiple access (CDMA), Global System for Mobile Communications (GSM), or short-range wireless communication. Further, computing devices can wirelessly charge a battery of the computing device. For example, the computing device may include inductive elements to permit the computing device to inductively charge the battery of the computing device.

SUMMARY

In one example, a computing device includes a display, an antenna element, at least one processor, and a housing. The display forms a first exposed surface of the computing device. The antenna element is configured to receive a wireless signal. The at least one processor is configured to receive, from the antenna element, an indication of the wireless signal and to output information to the display. The housing forms a second exposed surface of the computing device. The housing is formed by a group of metallic components. The group of metallic components are electronically isolated from the at least one processor.

In another example, a computing device includes a display, a housing, and at least one processor. The display forms a first exposed surface of the computing device. The housing forms a second exposed surface of the computing device. The housing includes a set of metallic components. The set of metallic components comprises a first group of metallic components and a second group of metallic components. The first group of metallic components are located in a first region of the housing and are electronically and mechanically coupled to each other such that the first region of the housing prevents the wireless signal from being transmitted through the first region of the housing. The second group of metallic components are located in a second region of the housing and are electronically coupled to each other to form an antenna element that is configured to receive the wireless signal and to output the indication of the wireless signal to the at least one processor, the antenna element forming an electrically conductive element that is concentrically wound.

In another example, a computing device includes a display, an antenna element, at least one processor, and a housing. The display forms a first exposed surface of the computing device. The antenna element is configured to receive a wireless signal. The at least one processor is configured to receive, from the antenna element, an indication of the wireless signal and to output information to the display. The housing forms a second exposed surface of the computing device. The housing is formed by a set of metallic components. The set of metallic components includes a first group of metallic components and a second group of metallic components. The first group of metallic components are located in a first region of the housing and are electronically and mechanically coupled to each other such that the first region of the housing prevents the wireless signal from being transmitted through the first region of the housing. The second group of metallic components are located in a second region of the housing and are electronically isolated from the first group of metallic components located in the first region of the housing. Each one of the second group of metallic components located in the second region of the housing is mechanically coupled by a non-conductive material to another one of the second group of metallic components, such that the second region of the housing permits the wireless signal to be transmitted through the second region of the housing.

The details of one or more aspects of this disclosure are set forth in the accompanying drawings and the description below. Other features, objects, and advantages of the disclosure will be apparent from the description and drawings, and from the claims.

BRIEF DESCRIPTION OF DRAWINGS

FIG. 3C is a conceptual diagram illustrating an enlarged view of a first region of the housing of the computing device of FIG. 3A, in accordance with one or more aspects of the present disclosure.

FIG. 4C is a conceptual diagram illustrating an enlarged view of a first region of the housing of the computing device of FIG. 4A, in accordance with one or more aspects of the present disclosure.

DETAILED DESCRIPTION

In general, this disclosure is directed to techniques for enabling a computing device having a metallic housing to use and/or process wireless signals. For example, rather than relying on a slot of a metallic housing to permit wireless signals to be received by the computing device, a computing device may have a metallic housing that is formed of individual metal pieces that are electronically isolated to allow a wireless signal to pass through the metallic housing.

In some examples, the computing device includes a display forming a first exposed surface (e.g., top) of the computing device, an antenna element, at least one processor, and a housing. The antenna element (e.g., an inductive coil) may be configured to receive a wireless signal (e.g., a signal using near field communication (NFC), a wireless charging signal, or another wireless signal). The at least one processor may be configured to receive, from the antenna element, an indication of the wireless signal and to output information to the display. The at least one processor may include a reference node (e.g., ground node). The housing may form a second exposed surface (e.g., back) of the computing device and may be formed of a set of metallic components (e.g., a mosaic of electronically isolated aluminum alloy pieces). The set of metallic components may be electronically isolated from the at least one processor and/or the reference node. In some examples, the antenna element may be formed by a group of the set of metallic components. In some examples, the antenna element may be separate from the housing (e.g., inside the housing).

By forming the housing of the computing device of a set of metallic components, a resulting computing device may have a stronger housing, better signal reception, and a more desirable metal unibody look than computing devices using a metallic housing with a slot for wireless signals. In this way, techniques of this disclosure may improve a strength of a housing of a computing device and improve a signal reception while achieving the metal uni-body look. Further, techniques of this disclosure may permit a reduced thickness of a resulting computing device since the housing may incorporate an antenna element.

Figure 1:
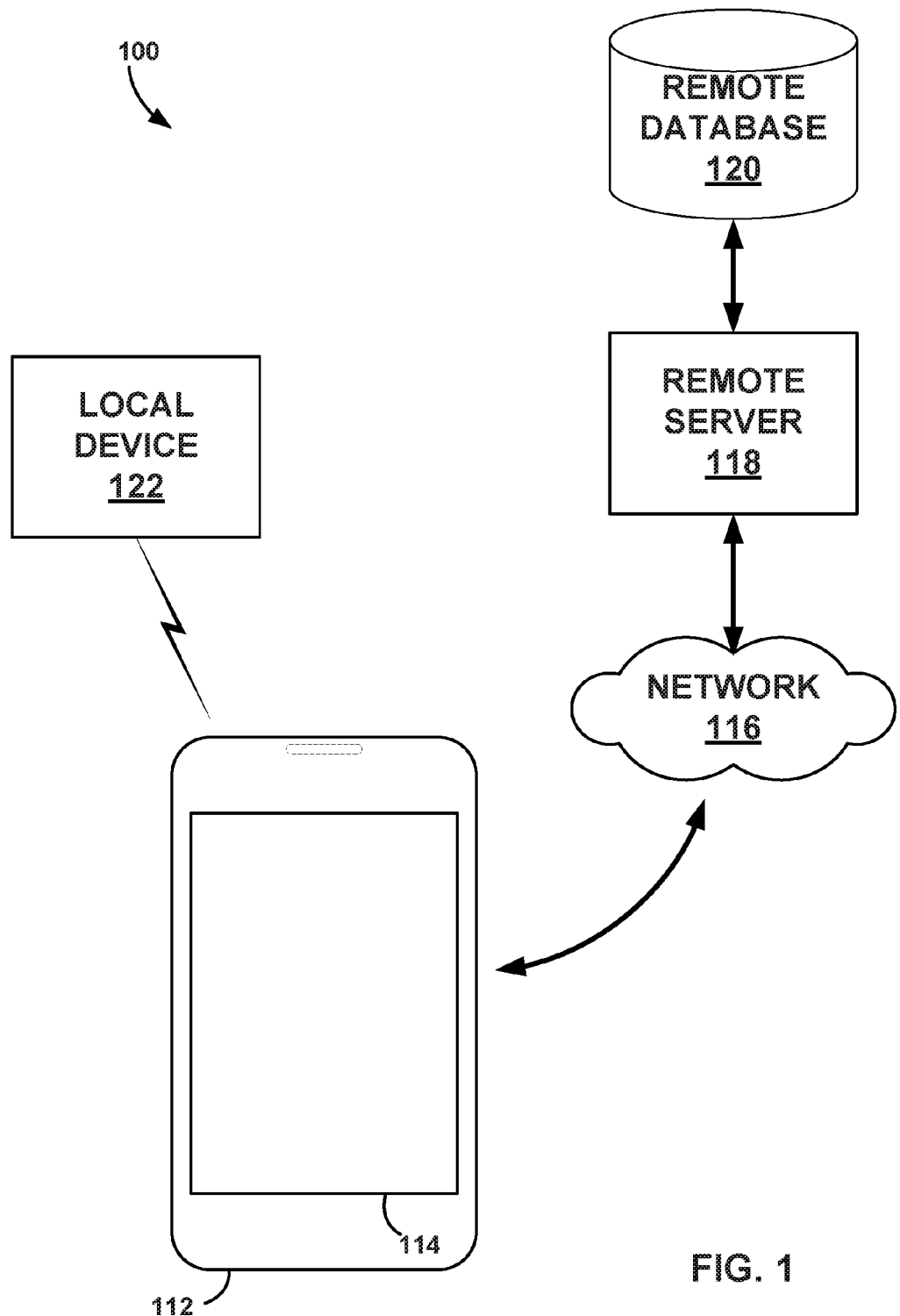
FIG. 1 is a conceptual diagram illustrating an example computing device that is configured to enable various exemplary wireless communications, in accordance with one or more aspects of the present disclosure.

FIG. 1 is a conceptual diagram illustrating an example computing device 112 that is configured to process various exemplary wireless signals, in accordance with one or more aspects of the present disclosure. As shown in FIG. 1, system 100 includes computing device 112, network 116, remote server 118, remote database 120, and local device 122. Computing device 112, in some examples, is or is a part of a portable computing device (e.g., a mobile phone, a netbook, a notebook, or a tablet device). In other examples, computing device 112 may be at least a part of a digital camera, a music player, or any other device that a user may carry or move between different locations. Computing device 112 may also connect to network 116 (e.g., a wired or wireless network).

Computing device 112 may include a short-range communication module (not shown) capable of initiating wireless communication with local device 122 over a relatively short distance. For example, this short distance may be less 100 meters, less than 10 meters, less than 1 meter, or even less than 10 centimeters. In some examples, computing device 112 may initiate communication with a local device 122 when computing device 112 is within, e.g., 5 centimeters of local device 122. In some examples, a user may place computing device 112 directly over or even touching local device 122 such that computing device 112 may communicate with local device 122 at that particular location of computing device 112. If the user moves computing device 112 across local device 122, computing device 112 may communicate with local device 122 as computing device 112 is moved. In some examples, local device 122 may be configured to provide, via short-range communication, electrical energy to computing device 112. For example, local device 122 may be configured to provide, via an inductive short-range signal, electrical energy to an inductive coil of computing device 112.

As described herein, computing device 112 may be capable of short-range communication. One example of short-range communication is NFC. NFC communication can occur between two devices in different modes. Another example of short-range communication is radio-frequency identification (RFID). For example, computing device 112 may operate in at least two different modes to communicate with local device 122 using NFC. For example, computing device 112 and local device 122 may be configured to operate in a passive mode and an active mode of operation. In an active mode of operation, computing device 112 may generate a first alternating magnetic field that is received by local device 122 in physical proximity to computing device 112. In response, local device 122 may generate a second alternating magnetic field that is received by computing device 112. In this way, data may be communicated between computing device 112 and local device 122 such as using peer-to-peer communication. In the active mode; computing device 112 may also power or activate a passive device to retrieve data from the passive device, as further described below. In this manner, computing device 112 may include passive near-field communication hardware.

In a passive mode of operation, load modulation techniques may be employed to facilitate data communication between computing device 112 and local device 122. In a passive mode, local device 122 does not actively generate an alternating magnetic field in response to the alternating magnetic field of computing device 112, but generates an alternating magnetic field as a result of the induced voltage and applied load at the receiver of local device 122. In some cases, local device 122 may include electrical hardware (e.g., an NFC module) that generates a change in impedance in response to the alternating magnetic field generated by computing device 112. For example, computing device 112 may generate an alternating magnetic field that is received by local device 122. Electrical hardware in local device 122 may generate a change in impedance in response to the alternating magnetic field. The change in impedance may be detected by the NFC module of computing device 112. In this way, load modulation techniques may be used by computing device 112 to obtain information from local device 122. Other well-known modulation techniques including phase modulation and/or amplitude modulation (resulting from load modulation) may also be employed to facilitate data communication between computing device 112 and local device 122 in other examples.

Network 116 may be any wired or wireless network that allows computing device 112 to access another computing device and/or the Internet. For example, computing device 112 may connect to network 116 to transmit information to remote server 118. Remote server 118 may then access remote database 120 to retrieve associated supplemental information. Remote server 118 may then transmit the supplemental information to computing device 112 using network 116. When computing device 112 receives the supplemental information from remote server 118, computing device 112 may display or otherwise present the supplemental information to the user. In one example, computing device 112 may use display 114 to present the supplemental information to the user. However, computing device 112 may additionally, or alternatively, use other output devices to present visual, audio, or even tactile feedback to the user according to the supplemental information.

Display 114 may include an input device and an output device so that the user can communicate with computing device 112. In one example, display 114 may be a touch screen interface. In other examples, computing device 112 may include a one or more buttons, pads, joysticks, mice, or any other device capable of turning user actions into electrical signals that control computing device 112. In addition, computing device 112 may include one or more microphones, speakers, cameras, or tactile feedback devices to deliver information to the user or receive information.

In some examples, computing device 112 includes display 114 forming a first exposed surface (e.g., top) of computing device 112, an antenna element, at least one processor, and a housing. The antenna element (e.g., an inductive coil) may be configured to receive a wireless signal (e.g., a signal using NFC, a wireless charging signal, or another wireless signal), for example, from local device 122. A short-range communication module operating on the at least one processor may be configured to receive, from the antenna element, an indication of the wireless signal and to output information to display 114. The housing may form a second exposed surface (e.g., back) of computing device 112 and may be formed of a set of metallic components (e.g., a mosaic of electronically isolated aluminum alloy pieces). The set of metallic components may be electronically isolated from the at least one processor. In some examples, the antenna element may be formed by a group of the set of metallic components. In some examples, the antenna element may be separate from the housing (e.g., inside the housing).

In this manner, the ability of computing device 112 to access supplemental information may increase an amount of information, a variety of information, and an accuracy of information available to the user. Additionally, the ability of computing device 112 to access electrical energy from local device 122 may increase a usefulness of the device, since the computing device 112 may be more easily charged.

Figure 2:
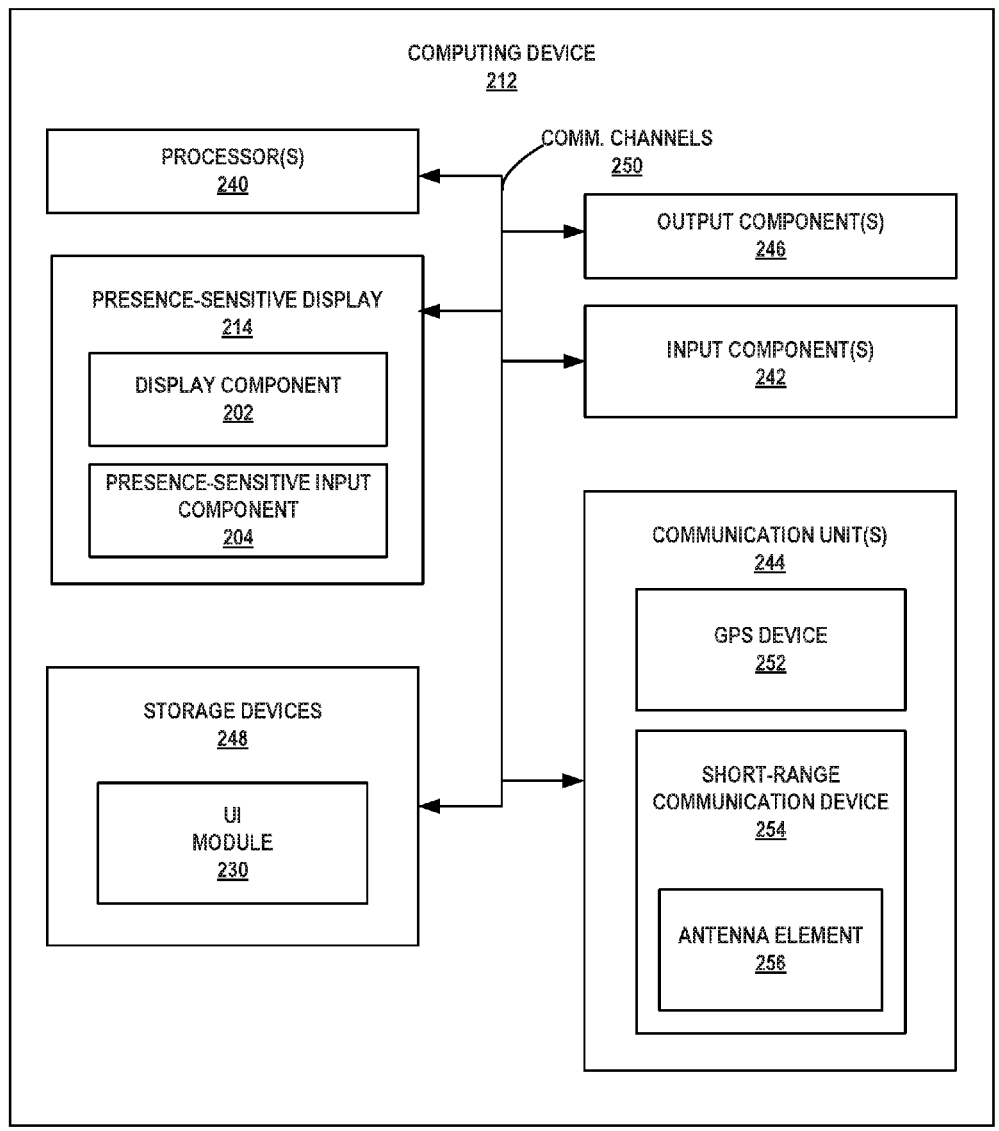
FIG. 2 is a block diagram illustrating components of one example of the computing device shown in FIG. 1, in accordance with one or more aspects of the present disclosure.

FIG. 2 is a block diagram illustrating components of one example of the computing device 112 shown in FIG. 1, in accordance with one or more aspects of the present disclosure. Computing device 212 of FIG. 2 in some examples represents an example of computing device 112 of FIG. 1. FIG. 2 illustrates only one particular example of computing device 212, and many other examples of computing device 212 may be used in other instances and may include a subset of the components included in example computing device 212 or may include additional components not shown in FIG. 2.

As shown in the example of FIG. 2, computing device 212 includes presence-sensitive display 214, one or more processors 240, one or more input components 242, one or more communication units 244, one or more output components 246, and one or more storage devices 248. Presence-sensitive display 214 includes display component 202 and presence-sensitive input component 204.

Communication channels 250 may interconnect each of the components 202, 204, 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more input components 242 of computing device 212 may receive input. Examples of input are tactile, audio, image and video input. Input components 242 of computing device 212, in one example, includes a presence-sensitive display, touch-sensitive screen, mouse, keyboard, voice responsive system, a microphone or any other type of device for detecting input from a human or machine. Presence-sensitive input component 204 of presence-sensitive display 214 may, in some cases, be one of input components 242. In some examples, input components 242 include one or more sensor components such as one or more location sensors (global positioning system (GPS) components, Wi-Fi components, cellular components), one or more temperature sensors, one or more movement sensors (e.g., accelerometers, gyros), one or more pressure sensors (e.g., barometer one or more ambient light sensors, and one or more other sensors (e.g., microphone, a still camera, a video camera, a body camera, eyewear, or other camera device that is operatively coupled to computing device 200, infrared proximity sensor, hygrometer, and the like).

One or more output components 246 of computing device 212 may generate output. Examples of output are tactile, audio, still image and video output. Output components 246 of computing device 212, in one example, includes a presence-sensitive display, sound card, video graphics adapter card, speaker, cathode ray tube (CRT) monitor, liquid crystal display (LCD), or any other type of device for generating output to a human or machine. Display component 202 of presence-sensitive display 214 may, in some cases, be one of output components 246.

One or more communication units 244 of computing device 212 may communicate with external devices via one or more wired and/or wireless networks by transmitting and/or receiving network signals on the one or more networks. For example, communication units 244 may be configured to communicate over a network with a remote computing system. As shown, one or more communication units 244 may include GPS device 252 and short-range communication device 254. Communication unit 244 may include a network interface card (e.g. such as an Ethernet card), an optical transceiver, a radio frequency transceiver, or any other type of device that can send and/or receive information. Other examples of communication units 244 may include short wave radios, cellular data radios, wireless network radios, as well as universal serial bus (USB) controllers.

GPS device 252 may include one or more satellite radios capable of determining the geographical location of computing device 212. Alternatively, computing device 12 may transmit the GPS coordinates to remote server 118 of FIG. 1.

Short-range communication device 254 may be an NFC device. As shown, short-range communication device 254 may include antenna element 256. In general, short-range communication device 254 may be configured to communicate wirelessly with other devices in physical proximity to short-range communication device 254 (e.g., approximately 0-100 meters). In other examples, short-range communication device 254 may be replaced with an alternative short-range communication device. These alternative short-range communication devices may operate according to Bluetooth®, Ultra-Wideband radio, or other similar protocols. In some examples, short-range communication device 254 may include a rectifier configured to electronically rectify a voltage received at antenna element 256. In some examples, the rectified voltage may be used by short-range communication device 254 to supply electrical power to computing device 212.

Antenna element 256 may be any suitable conductive element configured to receive signals via a short-range communication. For example, antenna element 256 may form an electrically conductive element that is concentrically wound. Said differently, antenna element 256 may be a conductive length of wire that is wound to potentially maximize an inductance of the length of wire, thereby improving a signal strength and/or an amount of power transferred via a short-range communication. In some examples, antenna element 256 may be configured to process NFC signals. For example, antenna element 256 may be configured to operate in an industrial, scientific, and medical (ISM) radio band of 13.56 MHz on ISO/IEC 18000-3 air interface at rates ranging from 106 to 454 kbit/s. In some examples, antenna element 256 may be configured to operate within less than 20 centimeters from another antenna element. In some examples, antenna element 256 may be configured comply with one or more provisions of international organization for standardization (ISO) 13157.

Presence-sensitive display 214 of computing device 212 includes display component 202 and presence-sensitive input component 204. Display component 202 may be a screen at which information is displayed by presence-sensitive display 214 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an [x, y] coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence-sensitive input component 204 also provides output to a user using tactile, audio, or video stimuli as described with respect to display component 202. In the example of FIG. 2, presence-sensitive display 214 may present a user interface.

While illustrated as an internal component of computing device 212, presence-sensitive display 214 may also represent and an external component that shares a data path with computing device 212 for transmitting and/or receiving input and output. For instance, in one example, presence-sensitive display 214 represents a built-in component of computing device 212 located within and physically connected to the external packaging of computing device 212 (e.g., a screen on a mobile phone). In another example, presence-sensitive display 214 represents an external component of computing device 212 located outside and physically separated from the packaging or housing of computing device 212 (e.g., a monitor, a projector, etc. that shares a wired and/or wireless data path with computing device 212).

Presence-sensitive display 214 of computing device 212 may receive tactile input from a user of computing device 212. Presence-sensitive display 214 may receive indications of the tactile input by detecting one or more tap or non-tap gestures from a user of computing device 212 (e.g., the user touching or pointing to one or more locations of presence-sensitive display 214 with a finger or a stylus pen). Presence-sensitive display 214 may present output to a user. Presence-sensitive display 214 may present the output as a graphical user interface, which may be associated with functionality provided by various functionality of computing device 212. For example, presence-sensitive display 214 may present various user interfaces of components of a computing platform, operating system, applications, or services executing at or accessible by computing device 212 (e.g., an electronic message application, a navigation application, an Internet browser application, a mobile operating system, etc.). A user may interact with a respective user interface to cause computing device 212 to perform operations relating to one or more the various functions.

Presence-sensitive display 214 of computing device 212 may detect two-dimensional and/or three-dimensional gestures as input from a user of computing device 212. For instance, a sensor of presence-sensitive display 214 may detect a user's movement (e.g., moving a hand, an arm, a pen, a stylus, etc.) within a threshold distance of the sensor of presence-sensitive display 214. Presence-sensitive display 214 may determine a two- or three-dimensional vector representation of the movement and correlate the vector representation to a gesture input (e.g., a hand-wave, a pinch, a clap, a pen stroke) that has multiple dimensions. In other words, presence-sensitive display 214 can detect a multi-dimension gesture without requiring the user to gesture at or near a screen or surface at which presence-sensitive display 214 outputs information for display. Instead, presence-sensitive display 214 can detect a multi-dimensional gesture performed at or near a sensor which may or may not be located near the screen or surface at which presence-sensitive display 214 outputs information for display.

One or more processors 240 may implement functionality and/or execute instructions associated with computing device 212. Examples of processors 240 include application processors, display controllers, auxiliary processors, one or more sensor hubs, and any other hardware configure to function as a processor, a processing unit, or a processing device. Module 230 may be operable by processors 240 to perform various actions, operations, or functions of computing device 212. For example, processors 240 of computing device 212 may retrieve and execute instructions stored by storage devices 248 that cause processors 240 to perform the operations of module 230. The instructions, when executed by processors 240, may cause computing device 212 to store information within storage devices 248.

One or more storage devices 248 within computing device 212 may store information for processing during operation of computing device 212 (e.g., computing device 212 may store data accessed by module 230 during execution at computing device 212). In some examples, storage devices 248 include a temporary memory, meaning that a primary purpose of storage devices 248 is not long-term storage. Storage devices 248 on computing device 212 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248, in some examples, include one or more non-transitory computer-readable storage mediums. Storage devices 248 may be configured to store larger amounts of information than typically stored by volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with module 230. Storage devices 248 may include a memory configured to store data or other information associated with module 230.

UI module 230 manages user interactions with presence-sensitive display 214 and other components of computing device 212. In other words, UI module 230 may act as an intermediary between various components of computing device 212 to make determinations based on user input detected by presence-sensitive display 214 and generate output at presence-sensitive display 214 in response to the user input.

In some examples, computing device 212 includes presence-sensitive display 214 forming a first exposed surface (e.g., top) of computing device 212, antenna element 256, processor 240, and a housing. Antenna element 256 (e.g., an inductive coil) may be configured to receive a wireless signal (e.g., a signal using NFC, a wireless charging signal, or another wireless signal). Short-range communication device 254 may be configured to receive, from antenna element 256, an indication of the wireless signal and to output information to presence-sensitive display 214. The housing may form a second exposed surface (e.g., back) of computing device 212 and may be formed of a set of metallic components (e.g., a mosaic of electronically isolated aluminum alloy pieces). The set of metallic components may be electronically isolated from processor 240. In some examples, antenna element 256 may be formed by a group of the set of metallic components. In some examples, antenna element 256 may be separate from the housing (e.g., inside the housing).

In this manner, the ability of computing device 212 to access supplemental information may increase an amount of information, a variety of information, and an accuracy of information available to the user. Additionally, the ability of computing device 212 to access electrical energy from a short-range communication may increase a usefulness of the device, since the computing device 212 may be more easily charged.

Figure 3A:
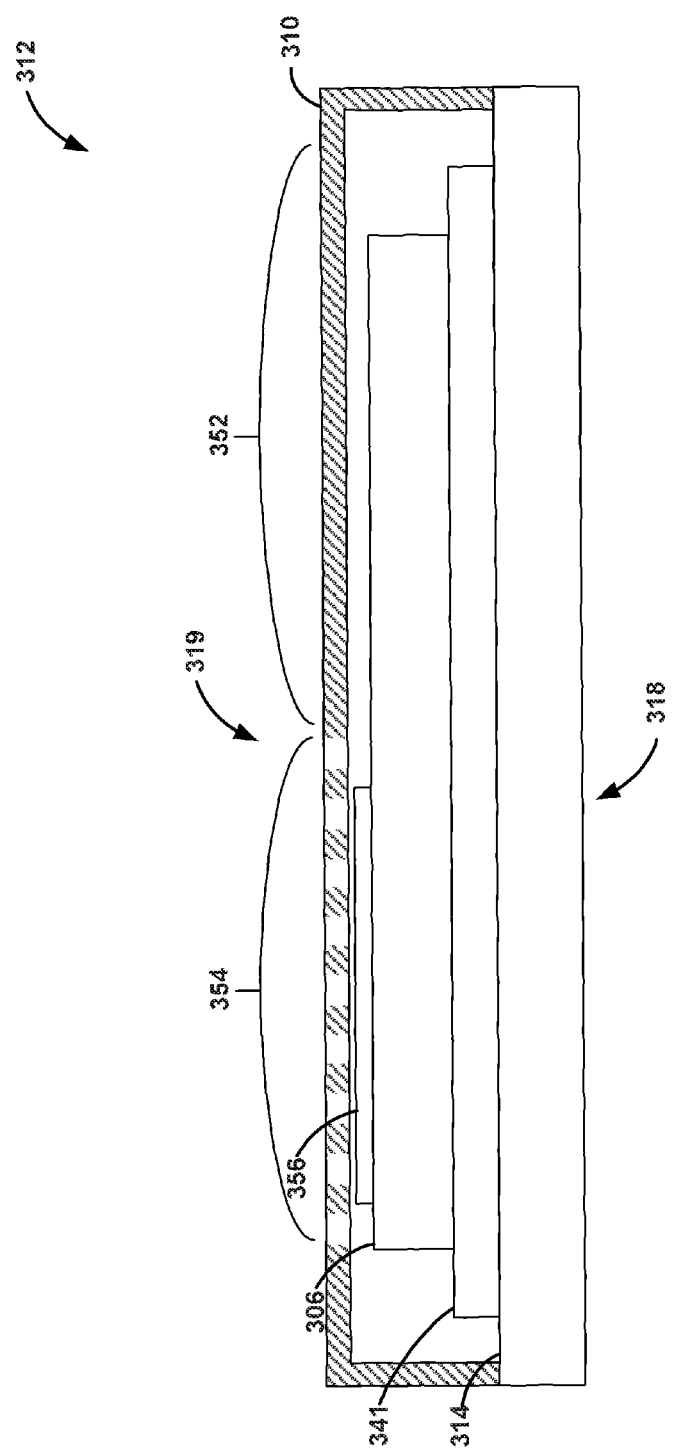
FIG. 3A is a conceptual diagram illustrating a cross-sectional view of a first computing device, in accordance with one or more aspects of the present disclosure.

FIG. 3A is a conceptual diagram illustrating a cross-sectional view of a computing device 312 in accordance with one or more aspects of the present disclosure. In various examples, computing device 312 may be one example of computing device 112 (FIG. 1) and/or computing device 212 (FIG. 2). As shown, computing device 312 includes display 314 which forms a first exposed surface 318 of computing device 312, and housing 310, which forms a second exposed surface 319 of computing device 312. Display 314 may be an example of display 114 of FIG. 1 and/or of presence-sensitive display 214 of FIG. 2. Computing device 312 further includes circuit board 341, battery 306, and antenna element 356. Antenna element 356 may be an example of antenna element 256 of FIG. 2.

Circuit board 341 may be any suitable structure configured to interface with display 314 and/or antenna element 356 to one or more components of circuit board 341. For example, circuit board 341 may include one or more processors, which may be examples of processors 240 of FIG. 2, that are configured to receive, from antenna element 356, an indication of a wireless signal and to output information to display 314. In some examples, circuit board 341 is a printed circuit board (PCB).

Battery 306 may be configured to store energy for use by display 314 and/or circuit board 341. Examples of battery 306 may include lead-acid, nickel metal hydride, lithium ion, or another types of battery. Although FIG. 3A illustrates battery 306 as rectangular, battery 306 may have any suitable shape. For example, battery 306 may have a rounded shape, square shape, or an irregular shape.

Housing 310 may be configured to form a structure of computing device 312 as well as to protect circuit board 341, battery 306, and antenna element 356. In some examples, housing 310 includes one or more metallic components. For example, housing 310 may be formed of an electromagnetically transparent decorative metallic (ETDM) surface. Additionally, or alternatively, housing 310 may be formed of a non-conductive material. For example, housing 310 may include plastic, resin, or another non-conductive material. That is, in some examples, housing 310 may be formed of metal cells that are electronically isolated by a non-conductive material and mechanically coupled together by the non-conductive material.

In some examples, housing 310 may be electronically isolated from circuit board 341. For example, the one or more metallic components of housing 310 may be electronically isolated, by a non-conductive material. In some examples, circuit board 341 may include a reference node, for example, an earth ground that may be electronically isolated from circuit board 341.

In some examples, housing 310 may include multiple regions. For example, as shown, housing 310 may include a first region 352 and second region 354. In some examples, first region 352 may be configured to prevent a wireless signal from being transmitted through first region 352 of the housing 310. In some examples second region 354 of housing 310 may be positioned over antenna element 356 such that antenna element 356 receives a wireless signal to be transmitted through second region 354 of housing 310. Said differently, the non-conductive material that spaces apart metallic components within second region 354 may be configured to electrically isolate the metallic components, thereby allowing a wireless signal to pass through second region 354 of housing 310.

Figure 3B:
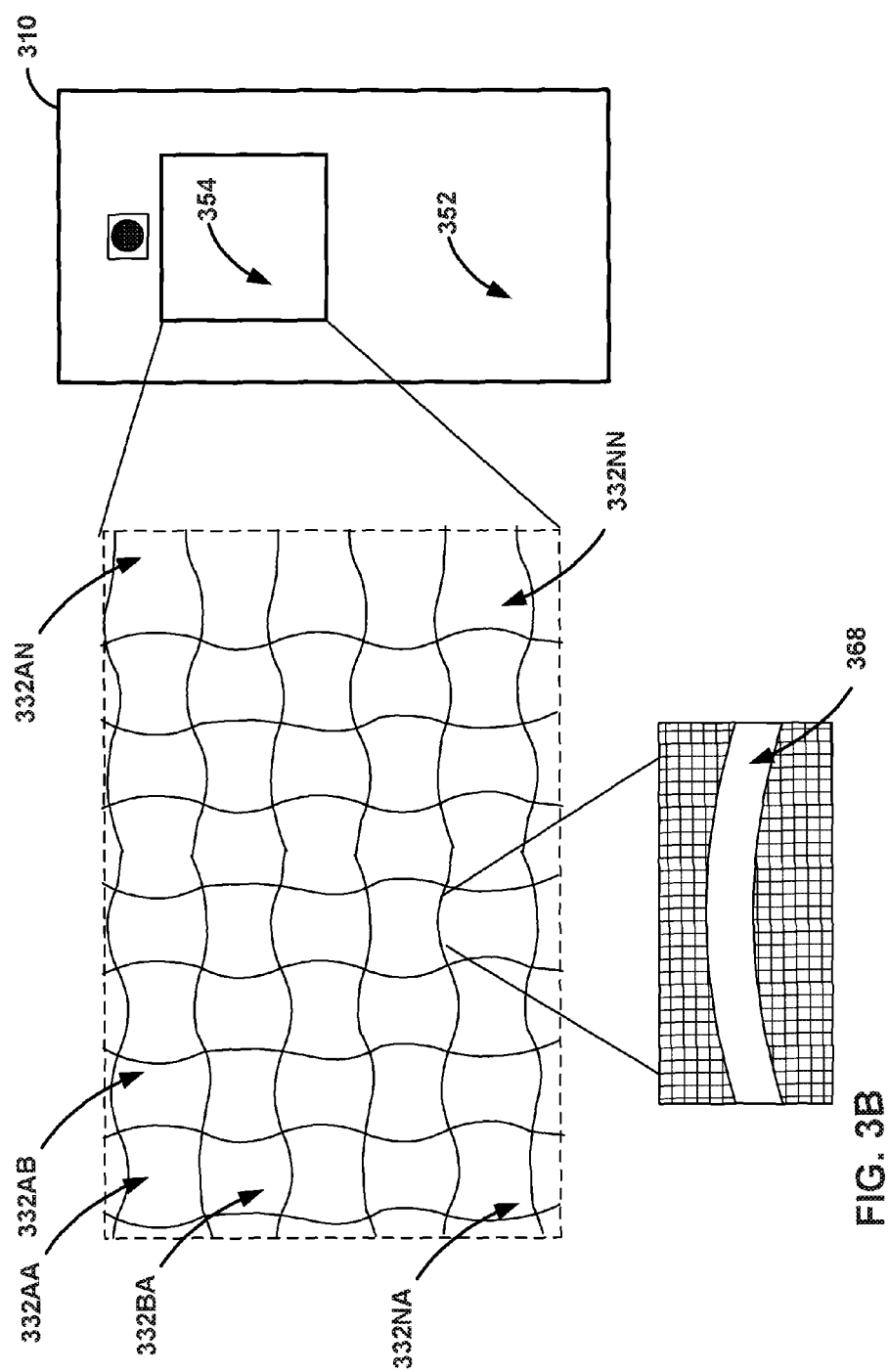
FIG. 3B is a conceptual diagram illustrating an enlarged view of a second region of a housing of the computing device of FIG. 3A, in accordance with one or more aspects of the present disclosure.

FIG. 3B is a conceptual diagram illustrating an enlarged view of second region 354 of housing 310 of computing device 312 of FIG. 3A, in accordance with one or more aspects of the present disclosure. As shown, second region 354 includes metallic components 332AA-332NN ("metallic components 332"). In some examples, metallic components 332 located in second region 354 may be formed by a material including a conductive material. For example, metallic components 332 located in second region 354 may be formed of an aluminum alloy. As shown in FIG. 3B, each one of metallic components 332 located in second region 354 of housing 310 is mechanically coupled by a non-conductive material 368 to another one of metallic components 332, such that second region 354 of housing 310 permits a wireless signal to be transmitted through second region 354 of the housing 310. Said differently, rather than including a plastic slot that cut into a metallic housing to permits a wireless signal to be received, computing device 312 permits the wireless signal to be transmitted through second region 354 of the housing 310 by, for example, by mechanically coupling each one of metallic components 332 located in second region 354 of housing 310 using a non-conductive material 368.

FIG. 3C is a conceptual diagram illustrating an enlarged view of first region 352 of housing 310 of computing device 312 of FIG. 3A, in accordance with one or more aspects of the present disclosure. As shown, first region 352 includes metallic components 362AA-NN ("metallic components 362"). In some examples, metallic components 362 located in first region 352 may be formed by a material including a conductive material. For example, metallic components 362 located in first region 352 may be formed of an aluminum alloy. As shown in FIG. 3C, each one of metallic components 362 located in first region 352 of housing 310 is electronically and mechanically coupled to each other such that first region 352 of housing 310 such that a wireless signal is prevented from being transmitted through first region 352 of the housing 310. For example, at least a portion 370 of metallic components 362 extends through non-conductive material 368 to form an electrical connection between metallic components 362. In some examples, metallic components 362 may be mechanically coupled to each other portions 370 of metallic components 362.

In this manner, rather than forming the entire housing 310 of a single region that permits wireless signals to be received, computing device 312 (e.g., second region 354), portions of housing 310 may have improved strength by electronically and mechanically coupling each one of metallic components 362 located in first region 352 of housing 310 to each other using a metallic material, for example, an aluminum alloy.

In some examples, metallic components 332 (FIG. 3B) located in second region 354 and metallic components 362 located in first region 352 may both be formed by a material including a conductive material. For example, metallic components 332 located in second region 354 and metallic components 362 located in first region 352 may be formed of an aluminum alloy. In some examples, metallic components 332 located in second region 354 are coupled to each other by a non-conductive material. For example, metallic components 332 located in second region 354 may be coupled together by a non-conductive resin and metallic components 362 located in first region 352 may be coupled together by the non-conductive resin.

In some examples, computing device 312 may include display 314 forming a first exposed surface 318 (e.g., top) of computing device 312, antenna element 356, circuit board 341, and housing 310, which may form a second exposed surface 319 (e.g., bottom) of computing device 312. For example, first exposed surface 318 may form a first major surface of computing device 312 and second exposed surface 319 may form a second major surface of computing device 312.

Antenna element 356 (e.g., an inductive coil) may be configured to receive a wireless signal (e.g., a signal using NFC, a wireless charging signal, or another wireless signal). In some examples, antenna element 356 may be configured to process NFC. For example, antenna element 356 may be concentrically wound. A short-range communication device of circuit board 341 may be configured to receive, from antenna element 356, an indication of the wireless signal and to output information to display 314. For example, circuit board 341 may include a short-range communication device that is configured to comply with one or more NFC protocols and provisions.

Housing 310 may be formed of metallic components 332 and 362. For example, metallic components 332 and 362 may form a mosaic of electronically isolated aluminum alloy pieces. Metallic components 332 and 362 may be electronically isolated from circuit board 341. For example, non-conductive material 368 may electronically isolate metallic components 332 and 362 from circuit board 341.

Metallic components 362 may be located in first region 352 of housing 310 and may be electronically and mechanically coupled to each other such that first region 352 of housing 310 prevents a wireless signal from being transmitted through first region 352 of housing 310. For example, portions of an aluminum alloy used to form metallic components 362 may extend through a resin of non-conductive material 368, thereby electronically coupling metallic components 362 to each other and mechanically coupling, by the aluminum alloy, metallic components 362 to each other.

Metallic components 332 may be located in second region 354 of housing 310 and may be electronically isolated from metallic components 362 located in first region 352 of housing 310. Additionally, or alternatively, metallic components 332 may be mechanically coupled to each other by non-conductive material 368. For example, a resin of non-conductive material 368 may space apart metallic components 332 from metallic components 362, thereby electronically isolating metallic components 362 from metallic components 332.

Each one of metallic components 332 located in second region 354 of housing 310 may be mechanically coupled by non-conductive material 368 to another one of metallic components 332, such that second region 354 of housing 310 permits a wireless signal to be transmitted through second region 354 of housing 310. For example, a resin of non-conductive material 368 may space apart metallic components 332 from each other, thereby electronically isolating metallic components 362 from each other.

Rather than forming the entire housing 310 of a single region that permits wireless signals to be received, housing 310 may include at least first region 352 that prevents the wireless signal to be received but may have improved strength and may include second region 354 that may be configured to permit wireless signals to be received by computing device 312. In this manner, computing device 312 may, in various examples, have a stronger housing, better signal reception, and a more desirable metal uni-body look than computing devices using a metallic housing with a slot for wireless signals.

Figure 4A:
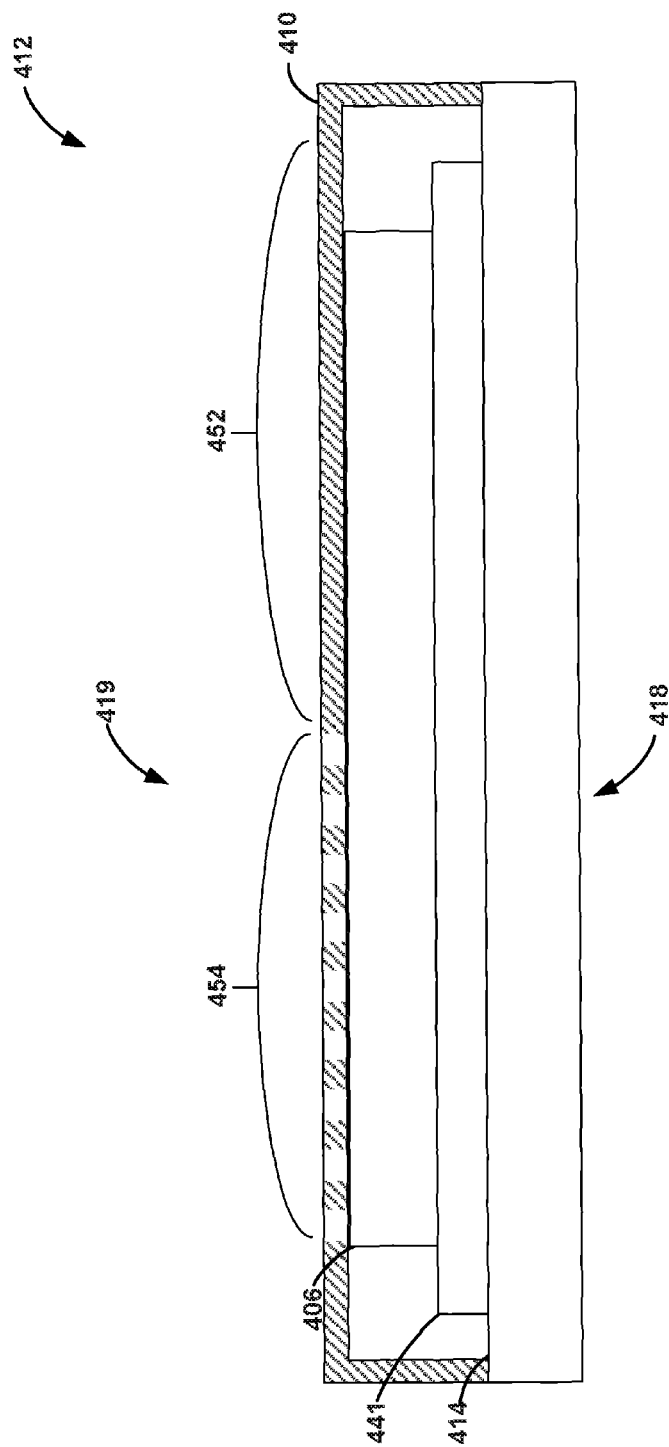
FIG. 4A is a conceptual diagram illustrating a cross-sectional view of a second computing device, in accordance with one or more aspects of the present disclosure.

FIG. 4A is a conceptual diagram illustrating a cross-sectional view of a computing device 412, in accordance with one or more aspects of the present disclosure. In various examples, computing device 412 may be one example of computing device 112 (FIG. 1) and/or computing device 212 (FIG. 2). As shown, computing device 412 includes display 414, which forms a first exposed surface 418 of computing device 412, and housing 410, which forms a second exposed surface 419 of computing device 412. Display 414 may be an example of display 114 of FIG. 1 and/or of presence-sensitive display 214 of FIG. 2. computing device 412 further includes circuit board 441, which may be an example of circuit board 441 of FIG. 3, and battery 406, which may be an example of battery 306 of FIG. 3.

In some examples, housing 410 may be electronically isolated from circuit board 441. For example, the one or more metallic components of housing 410 may be electronically isolated, by a non-conductive material. In some examples, circuit board 441 may include a reference node, for example, an earth ground that may be electronically isolated from circuit board 441.

In some examples, housing 410 may include multiple regions. For example, as shown, housing 410 may include a first region 452 and second region 454. In some examples, first region 452 may be configured to prevent a wireless signal from being transmitted through first region 452 of the housing 410. In some examples second region 454 may be configured to receive the wireless signal. For example, second region 454 may be configured to perform one or more function of antenna element 256 of FIG. 2.

Figure 4B:
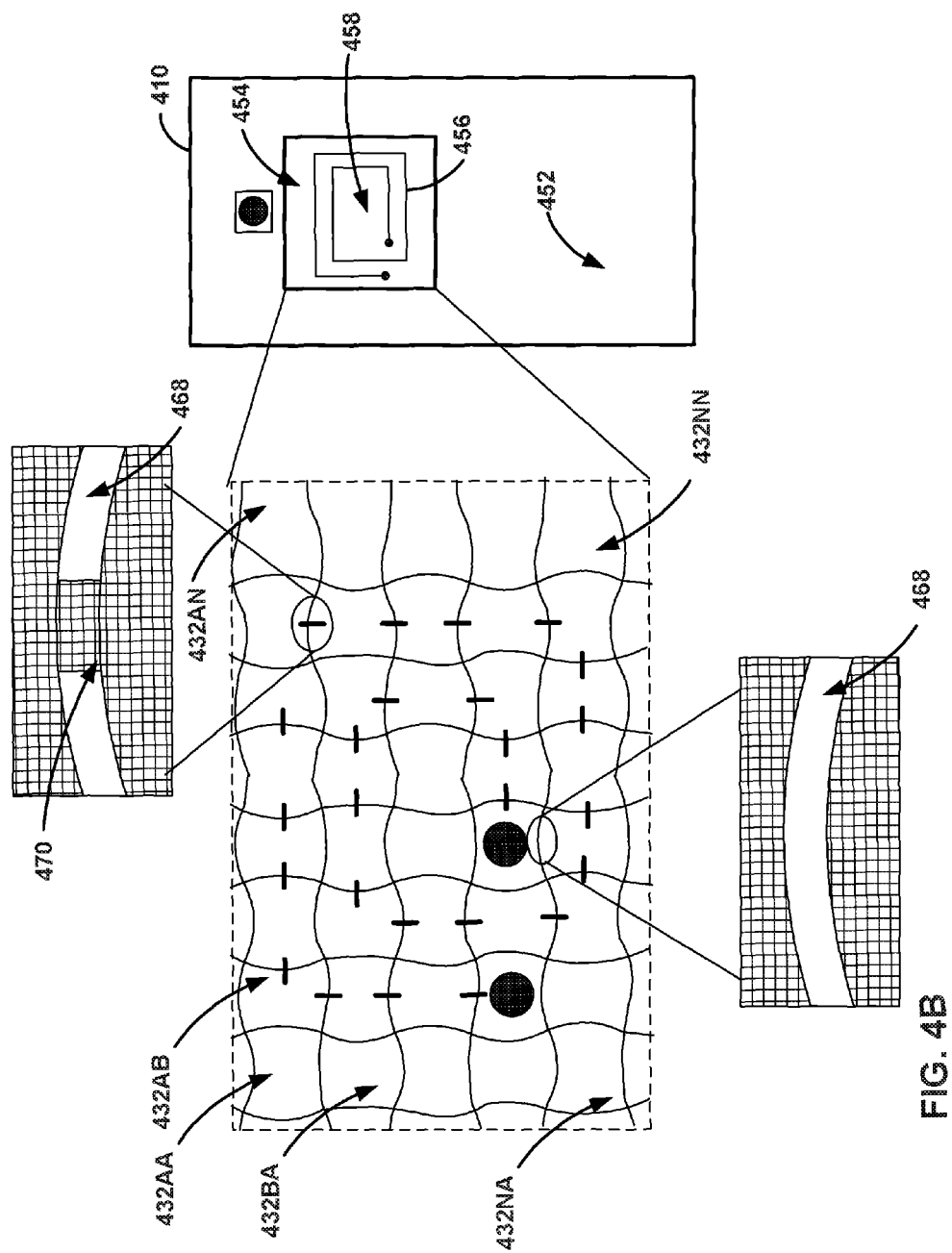
FIG. 4B is a conceptual diagram illustrating an enlarged view of a second region of a housing of the computing device of FIG. 4A, in accordance with one or more aspects of the present disclosure.

FIG. 4B is a conceptual diagram illustrating an enlarged view of second region 454 of housing 410 of computing device 412 of FIG. 4A, in accordance with one or more aspects of the present disclosure. As shown, second region 454 includes metallic components 432AA-NN ("metallic components 432"). In some examples, metallic components 432 located in second region 454 may be formed by a material including a conductive material. For example, metallic components 432 located in second region 454 may be formed of an aluminum alloy. As shown in FIG. 4B, metallic components 432 located in second region 454 of housing 310 are electronically coupled to each other to form an antenna element that is configured to receive a wireless signal. More specifically, metallic components 432 are electronically coupled to each other by portions of 470 of metallic components 432 to form an electrically conductive element 456 that is concentrically wound and electronically, isolated from other metallic components 432 by non-conductive material 468. As used herein, concentrically wound may refer to any element that extends in a clockwise or counterclockwise direction. In some examples, electrically conductive element 456 may be centered around a center point 458.

FIG. 4C is a conceptual diagram illustrating an enlarged view of a first region 452 of housing 410 of computing device 412 of FIG. 4A, in accordance with one or more aspects of the present disclosure. As shown, first region 452 includes metallic components 462AA-462NN ("metallic components 462"). In some examples, metallic components 462 located in first region 452 may be formed by a material including a conductive material. For example, metallic components 462 located in first region 452 may be formed of an aluminum alloy. As shown in FIG. 4C, each one of metallic components 462 located in first region 452 of housing 410 is electronically and mechanically coupled to each other such that first region 452 of housing 410 such that a wireless signal is prevented from being transmitted through first region 452 of the housing 410. For example, at least a portion 470 of metallic components 462 extends through non-conductive material 468 to form an electrical connection between metallic components 462.

In some examples, metallic components 432 (FIG. 4B) located in second region 454 and metallic components 462 located in first region 452 may be formed by a material including a conductive material. For example, metallic components 432 located in second region 454 and metallic components 462 located in first region 452 may be formed of an aluminum alloy. In some examples, metallic components 432 located in second region 454 are coupled to each other by a non-conductive material. For example, metallic components 432 located in second region 454 may be coupled together by a non-conductive resin and metallic components 462 located in first region 452 may be coupled together by the non-conductive resin.

In some examples, computing device 412 includes display 414 forming a first exposed surface 418 (e.g., top) of computing device 412, circuit board 441, and housing 410. A short-range communication device of circuit board 441 may be configured to receive, from electrically conductive element 456, an indication of the wireless signal and to output information to display 414. Housing 410 may form second exposed surface 419 (e.g., back) of computing device 412 and may be formed of metallic components 432 and 462 (e.g., a mosaic of electronically isolated aluminum alloy pieces). The metallic components 432 may be located in first region 452 of housing 410 and are electronically and mechanically coupled to each other such that first region 452 of housing 410 prevents the wireless signal from being transmitted through first region 452 of housing 410. The metallic components 462 may be located in second region 454 of housing 410 and are electronically coupled to each other to form an antenna element that is configured to receive the wireless signal and to output the indication of the wireless signal to the circuit board 441. The antenna element may form an electrically conductive element that is concentrically wound. For example, metallic components 462 may be electronically coupled together to form a single electronically conductive element that forms a coil suitable for receiving an NFC signal, for example, to charge battery 406 of computing device 412 using the NFC signal.

Rather than forming the entire housing 410 of a single region that permits wireless signals to be received, housing 410 may include at least first region 452 that prevents the wireless signal to be received but may have improved strength and may include second region 454 that may be configured to form an antenna element that is configured to receive the wireless signal. In this manner, computing device 412 may have a stronger housing, thinner construction, better signal reception, and a more desirable metal uni-body look than computing devices using a metallic housing with a slot for wireless signals.

Figure 5A:
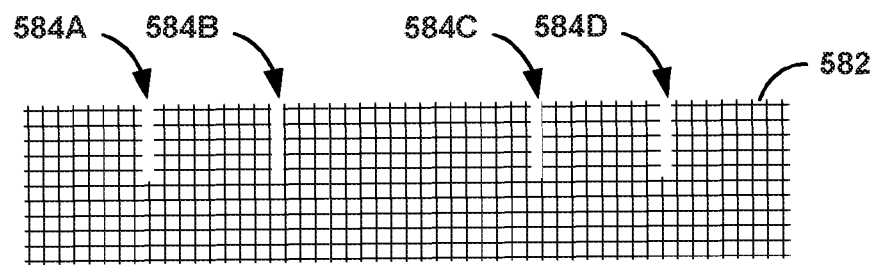
FIG. 5A is a conceptual diagram illustrating an example metallic member used to form a housing, in accordance with one or more aspects of the present disclosure.

FIG. 5A is a conceptual diagram illustrating an example metallic member 582 used to form a housing, in accordance with one or more aspects of the present disclosure. Metallic member 582 may be formed of any suitable metallic composition. Examples of metallic composition that may be used to form metallic member 582 may include, but are not limited, to aluminum alloy, titanium alloy, magnesium alloy, or another metallic composition. As shown in FIG. 5A, portions of metallic member 582 may be removed, by for example, but not limited to, a computer numerical control (CNC) milling machine, to form recesses 584A-N.

Figure 5B:
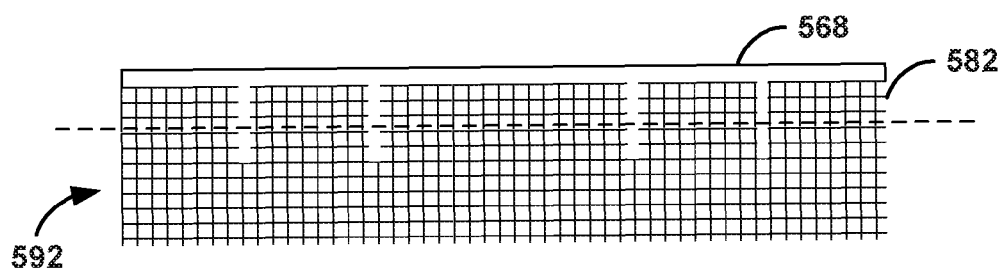
FIG. 5B is a conceptual diagram illustrating an example non-conductive material molded onto the metallic member of FIG. 5, in accordance with one or more aspects of the present disclosure.

FIG. 5B is a conceptual diagram illustrating an example non-conductive material 568 molded onto metallic member 582 of FIG. 5A, in accordance with one or more aspects of the present disclosure. In some examples, non-conductive material 568 is an example of non-conductive material 368 of FIGS. 3B-C and/or non-conductive material 468 of FIGS. 4B-C. Examples of non-conductive material 568 may include, but are not limited, to plastic, resin, or another non-conductive material. As shown in FIG. 5B, non-conductive material 568 fills recesses 584A-N. As shown, a lower portion 592 of metallic member 582 and non-conductive material 568 may be removed, by for example, but not limited to, a CNC milling machine.

Figure 5C:
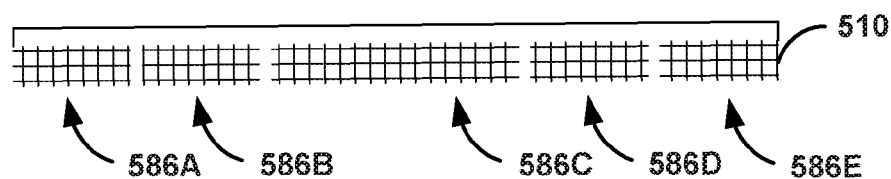
FIG. 5C is a conceptual diagram illustrating an example set of metallic components formed from the metallic member of FIG. 5, in accordance with one or more aspects of the present disclosure.

FIG. 5C is a conceptual diagram illustrating an example set of metallic components 586A-E formed from metallic member 582 of FIG. 5A, in accordance with one or more aspects of the present disclosure. In the example of FIG. 5C, the exterior of metallic components 586A-E may be finished, such as, for example, but not limited to, machining; grinding, polishing, sandblasting, anodizing, plating, decorating, coating, or another finishing process to form housing 510. One or more techniques to form housing 510 may be used to form housing 310 of FIGS. 3A-C and/or housing 410 of FIGS. 4A-C.

Figure 6:
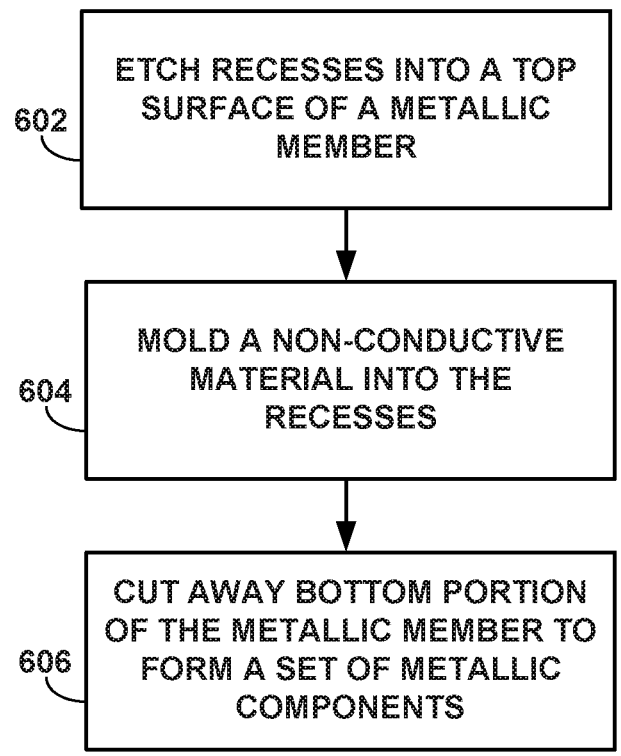
FIG. 6 is a flow diagram illustrating an example process that may be performed to manufacture a housing that is formed by a set of metallic components, in accordance with one or more aspects of the present disclosure.

FIG. 6 is a flow diagram illustrating an example process that may be performed to manufacture a housing that is formed by a set of metallic components, in accordance with one or more aspects of the present disclosure. One or more techniques of FIG. 6 may be used to form housing 310 of FIGS. 3A-C and/or housing 410 of FIGS. 4A-C.

The exemplary process of FIG. 6 includes etching (602) recesses into a top surface of a metallic member. For example, a CNC milling machine may remove portions of metallic member 582 of FIG. 5A to form recesses 584A-N. The exemplary process of FIG. 6 includes molding (604) a non-conductive material into the recesses. For example, an injection molding device injects non-conductive material 568 of FIG. 5B into recesses 584A-N of FIG. 5B. The exemplary process of FIG. 6 includes cutting (606) away a bottom portion of the metallic member to form a set of metallic components. For example, a CNC milling machine removes lower portion 592 of FIG. 5B of metallic member 582 and non-conductive material 568.

The following numbered clauses may illustrate one or more aspects of the disclosure:

Clause 1. A computing device, comprising: a display forming a first exposed surface of the computing device; an antenna element configured to receive a wireless signal; at least one processor configured to receive, from the antenna element, an indication of the wireless signal and to output information to the display; and a housing forming a second exposed surface of the computing device, the housing being formed by a plurality of metallic components, wherein the plurality of metallic components are electronically isolated from the at least one processor.

Clause 2. The computing device of clause 1, wherein: the plurality of metallic components comprises a first group of metallic components and a second group of metallic components; the first group of metallic components are located in a first region of the housing and are electronically and mechanically coupled to each other such that the first region of the housing prevents the wireless signal from being transmitted through the first region of the housing; and the second group of metallic components are located in a second region of the housing and are electronically coupled to each other to form the antenna element that is configured to receive the wireless signal.

Clause 3. The computing device of clause 2, wherein the antenna element forms an electrically conductive element that is concentrically wound.

Clause 4. The computing device of any combination of clauses 1-3, wherein: the plurality of metallic components comprises a first group of metallic components and a second group of metallic components; the first group of metallic components are located in a first region of the housing and are electronically and mechanically coupled to each other such that the first region of the housing prevents the wireless signal from being transmitted through the first region of the housing; the second group of metallic components are located in a second region of the housing and are electronically isolated from the first group of metallic components located in the first region of the housing; and each one of the second group of metallic components located in the second region of the housing is mechanically coupled by a non-conductive material to another one of the second group of metallic components, such that the second region of the housing permits the wireless signal to be transmitted through the second region of the housing.

Clause 5. The computing device of clause 4, wherein the second region of the housing is positioned over the antenna element such that the antenna element receives the wireless signal to be transmitted through the second region of the housing.

Clause 6. The computing device of any combination of clauses 4-5, wherein: the first group of metallic components are mechanically coupled to each other by a conductive material; and the second group of metallic components are mechanically coupled to each other by a non-conductive material.

Clause 7. The computing device of clause 6, wherein: the first group of metallic components are each formed by a material including the conductive material; and the second group of metallic components are each formed by a material including the conductive material.

Clause 8. The computing device of any combination of clauses 1-7, wherein the antenna element is configured to process near field communication (NFC).

Clause 9. A computing device, comprising: a display forming a first exposed surface of the computing device; a housing forming a second exposed surface of the computing device, the housing comprising a plurality of metallic components, wherein the plurality of metallic components comprises a first group of metallic components and a second group of metallic components; and at least one processor configured to receive an indication of a wireless signal and to output information to the display, wherein the first group of metallic components are located in a first region of the housing and are electronically and mechanically coupled to each other such that the first region of the housing prevents the wireless signal from being transmitted through the first region of the housing, and wherein the second group of metallic components are located in a second region of the housing and are electronically coupled to each other to form an antenna element that is configured to receive the wireless signal and to output the indication of the wireless signal to the at least one processor, the antenna element forming an electrically conductive element that is concentrically wound.

Clause 10. The computing device of clause 9, wherein: the first group of metallic components are mechanically coupled to each other by a conductive material; and the second group of metallic components are mechanically coupled to each other by a non-conductive material.

Clause 11. The computing device of clause 10, wherein: the first group of metallic components are each formed by a material including the conductive material; and the second group of metallic components are each formed by a material including the conductive material.

Clause 12. The computing device of any combination of clauses 9-11, wherein the first group of metallic components are electronically isolated from the at least one processor.

Clause 13. The computing device of clause 12, wherein the second group of metallic components are each electronically isolated from the at least one processor.

Clause 14. The computing device of any combination of clauses 9-13, wherein the antenna element is configured to process near field communication (NFC).

Clause 15. A computing device, comprising: a display forming a first exposed surface of the computing device; an antenna element configured to receive a wireless signal; at least one processor configured to receive, from the antenna element, an indication of the wireless signal and to output information to the display; and a housing forming a second exposed surface of the computing device, the housing being formed by a plurality of metallic components, wherein the plurality of metallic components comprises a first group of metallic components and a second group of metallic components, wherein the first group of metallic components are located in a first region of the housing and are electronically and mechanically coupled to each other such that the first region of the housing prevents the wireless signal from being transmitted through the first region of the housing, wherein the second group of metallic components are located in a second region of the housing and are electronically isolated from the first group of metallic components located in the first region of the housing, and wherein each one of the second group of metallic components located in the second region of the housing is mechanically coupled by a non-conductive material to another one of the second group of metallic components, such that the second region of the housing permits the wireless signal to be transmitted through the second region of the housing.

Clause 16. The computing device of clause 15, wherein the second region of the housing is positioned over the antenna element such that the antenna element receives the wireless signal to be transmitted through the second region of the housing.

Clause 17. The computing device of any combination of clauses 15-16, wherein: the first group of metallic components are mechanically coupled to each other by a conductive material; and the second group of metallic components are mechanically coupled to each other by a non-conductive material.

Clause 18. The computing device of clause 17, wherein: the first group of metallic components are each formed by a material including the conductive material; and the second group of metallic components are each formed by a material including the conductive material.

Clause 19. The computing device of any combination of clauses 15-18, wherein the first group of metallic components are electronically isolated from the at least one processor.

Clause 20. The computing device of clause 19, wherein the second group of metallic components are electronically isolated from the at least one processor.

Clause 21. The computing device of any combination of clauses 15-20, wherein the antenna element is configured to process near field communication (NFC).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically erasable programmable ROM (EEPROM), compact disk (CD)-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes CD, laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various aspects of the disclosure have been described. These and other embodiments are within the scope of the following claims.

What is claimed is:

1. A computing device, comprising:
   a display forming a first exposed surface of the computing device;
   an antenna element configured to receive a wireless signal;
   at least one processor configured to receive, from the antenna element, an indication of the wireless signal and to output information to the display; and
   a housing forming a second exposed surface of the computing device, the housing being formed by a plurality of metallic components that include a first group of metallic components and a second group of metallic components, wherein:
   the first group of metallic components is located in a first region of the housing,
   the metallic components from the first group of metallic components are electronically and mechanically coupled to each other so as to prevent the wireless signal from being transmitted through the first region of the housing,
   the second group of metallic components is located in a second region of the housing, and the metallic components from the second group of metallic components are electronically coupled to each other to form the antenna element.

2. The computing device of claim 1, wherein the antenna element forms an electrically conductive element that is concentrically wound.

3. The computing device of claim 1, wherein:
the first group of metallic components are mechanically coupled to each other by a conductive material; and
the second group of metallic components are mechanically coupled to each other by a conductive material.

4. The computing device of claim 3, wherein:
the first group of metallic components are each formed by a material including the conductive material; and
the second group of metallic components are each formed by a material including the conductive material.

5. The computing device of claim 1, wherein the antenna element is configured to receive near field communication (NFC) signals.

6. A computing device, comprising:
a display forming a first exposed surface of the computing device;
a housing forming a second exposed surface of the computing device, the housing comprising a plurality of metallic components, wherein the plurality of metallic components comprises a first group of metallic components and a second group of metallic components; and
at least one processor configured to receive an indication of a wireless signal and to output information to the display,
wherein the first group of metallic components are located in a first region of the housing and are electronically and mechanically coupled to each other such that the first region of the housing prevents the wireless signal from being transmitted through the first region of the housing, and
wherein the second group of metallic components are located in a second region of the housing and are electronically coupled to each other to form an antenna element that is configured to receive the wireless signal and to output the indication of the wireless signal to the at least one processor, the antenna element forming an electrically conductive element that is concentrically wound.

7. The computing device of claim 6, wherein:
the first group of metallic components are mechanically coupled to each other by a conductive material; and
the second group of metallic components are mechanically coupled to each other by a conductive material.

8. The computing device of claim 7, wherein:
the first group of metallic components are each formed by a material including the conductive material; and
the second group of metallic components are each formed by a material including the conductive material.

9. The computing device of claim 6, wherein the first group of metallic components are electronically isolated from the at least one processor.

10. The computing device of claim 9, wherein the second group of metallic components are each electronically isolated from the at least one processor.

11. The computing device of claim 6, wherein the antenna element is configured to process near field communication.

12. The computing device of claim 6,
wherein the plurality of metallic components includes a third group of metallic components,
wherein the third group of metallic components are mechanically coupled to each other by a non-conductive material, and
wherein the third group of metallic components are located in a third region of the housing between the first region and the second region and are mechanically coupled to the first group of metallic components and the second group of metallic components by the non-conductive material.

13. A method for wireless communication, the method comprising:
receiving, by an antenna element formed by a first plurality of metallic components of a group of metallic components that form a housing of a computing device, a wireless signal, wherein the first plurality of metallic components are located in a first region of the housing and are electronically coupled to each other, and wherein a second plurality of metallic components of the group of metallic components are located in a second region of the housing and are electronically coupled to each other so as to prevent the wireless signal from being transmitted through the second region of the housing, and wherein the second region is different than the first region; and
outputting, by the antenna element and to at least one processor of the computing device, an indication of the wireless signal.

14. The method of claim 13, wherein the computing device further comprises a display that forms a first exposed surface of the computing device, and wherein housing forms a second exposed surface of the computing device.

15. The method of claim 13, wherein the wireless signal comprises a near-field communication (NFC) signal.

* * * * *